United States Patent
Reichl et al.

(10) Patent No.: US 6,586,928 B1
(45) Date of Patent: Jul. 1, 2003

(54) DISTANCE MEASURING DEVICE

(75) Inventors: Asta Reichl, Stuttgart (DE); Thomas Klotzbuecher, Rudersberg (DE); Matthias Moerbe, Ilsfeld-Helfenberg (DE); Walter Schwarz, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/913,033

(22) PCT Filed: Apr. 17, 2000

(86) PCT No.: PCT/DE00/01207

§ 371 (c)(1),
(2), (4) Date: Aug. 8, 2001

(87) PCT Pub. No.: WO00/63640

PCT Pub. Date: Oct. 26, 2000

(30) Foreign Application Priority Data

Apr. 17, 1999 (DE) .......................... 199 17 466

(51) Int. Cl.$^7$ ............................. G01B 7/02; G01D 5/12
(52) U.S. Cl. .......................... 324/207.22; 324/207.24; 324/207.2
(58) Field of Search ................. 324/207.22, 207.24, 324/207.2, 207.21, 251, 252; 338/32 R, 32 H

(56) References Cited

U.S. PATENT DOCUMENTS

| | | | |
|---|---|---|---|
| 4,829,245 A | 5/1989 | Echasseriau et al. | |
| 5,574,365 A | * 11/1996 | Oyama et al. | ......... 324/207.22 |

FOREIGN PATENT DOCUMENTS

| | | |
|---|---|---|
| DE | 26 53 943 A | 6/1978 |
| DE | 29 23 544 | 12/1979 |
| DE | 37 04 729 A1 | 8/1988 |
| DE | 43 16 520 A1 | 11/1994 |
| DE | 199 17 466 C1 | 8/2000 |
| EP | 0 907 068 A | 4/1999 |

OTHER PUBLICATIONS

Patent Abstracts of Japan, vol. 010, No. 327 (P–5130, Nov. 7, 1986 & JP 61 134601 A, Jun. 21, 1986.

* cited by examiner

Primary Examiner—Walter E. Snow
(74) Attorney, Agent, or Firm—Michael J. Striker

(57) ABSTRACT

In a travel measuring instrument (10), a magnet (11) which is polarized in the movement direction (R) is disposed against a flux conducting part (12). The flux conducting part (12) has a surface (13), which is inclined and is embodied as oval, which is disposed opposite a magnetic field sensitive element (15) with an air gap (L1). When there is movement, the air gap (L1) changes so that the magnetic field sensitive element (15) generates an output signal proportional or linear to the movement direction R of the component to be monitored.

5 Claims, 5 Drawing Sheets

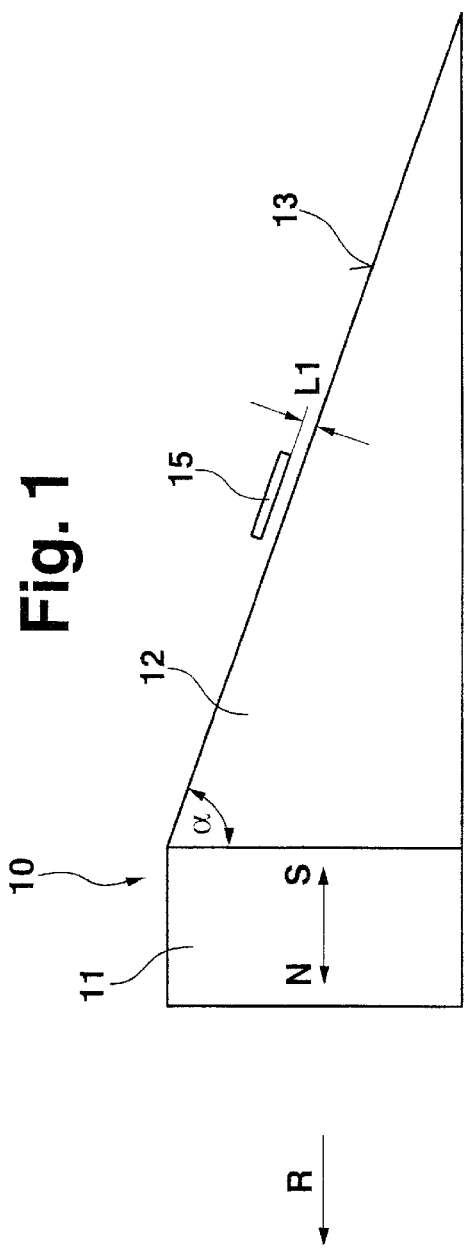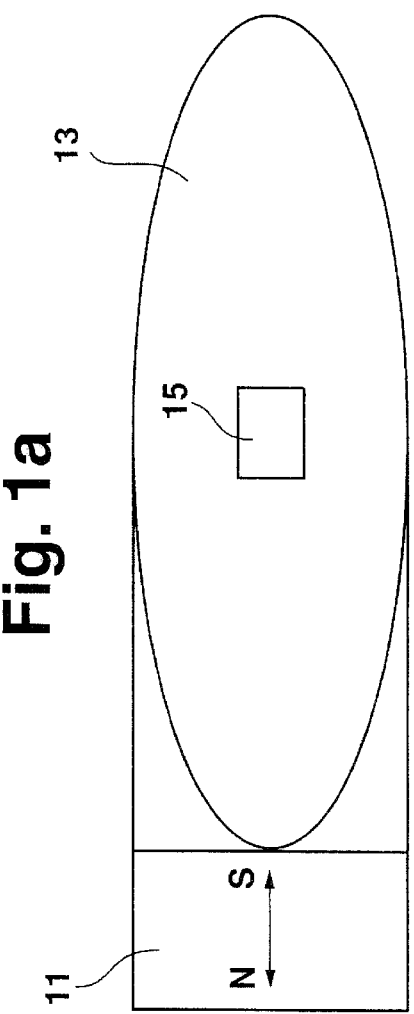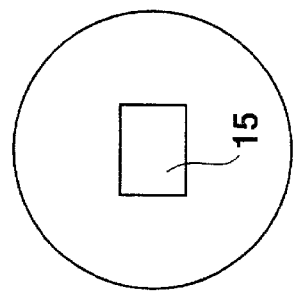

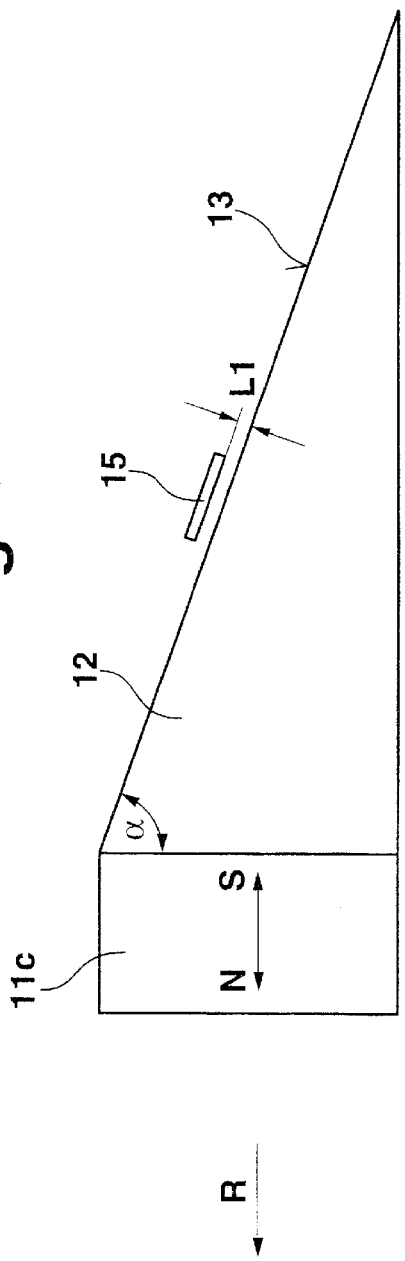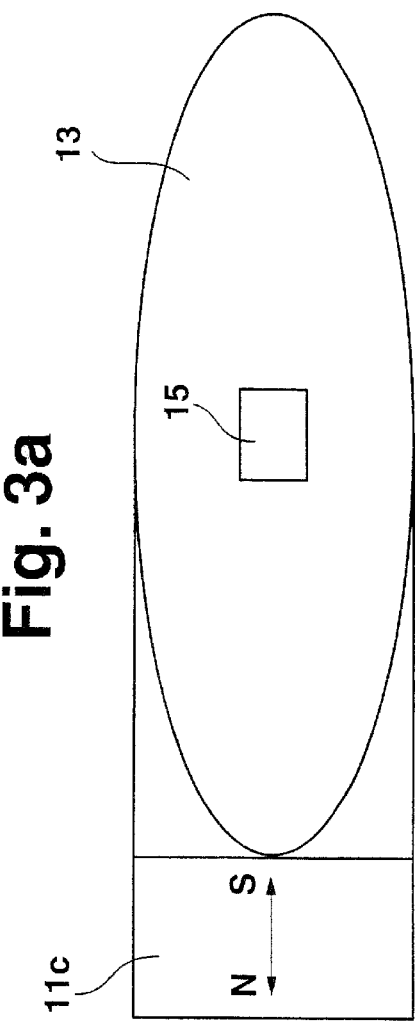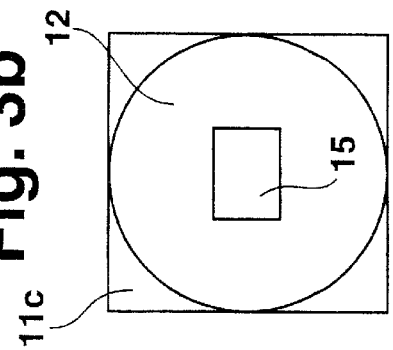

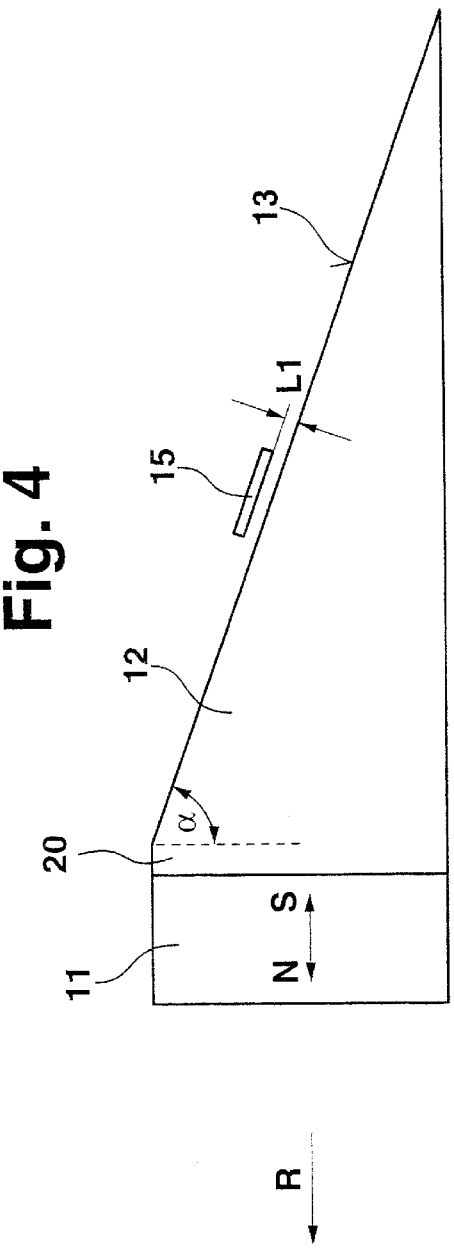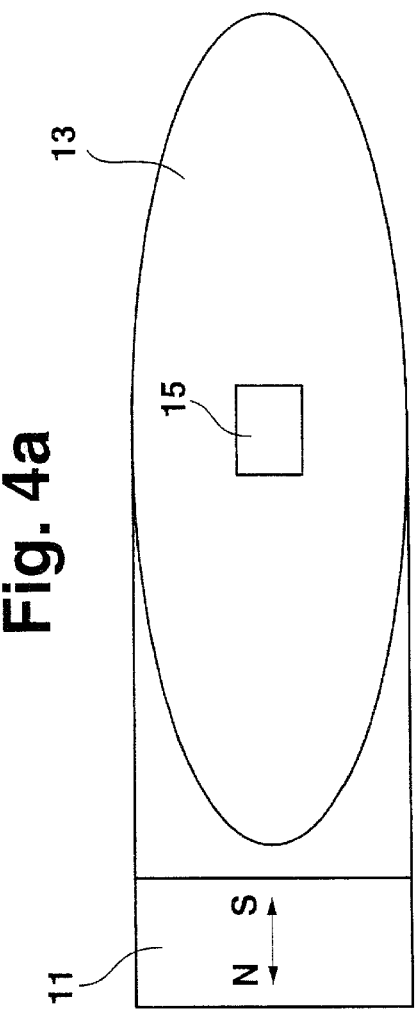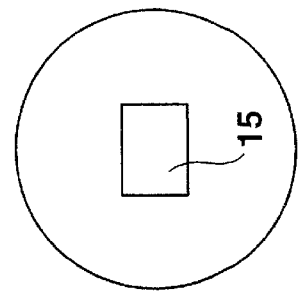

DISTANCE MEASURING DEVICE

PRIOR ART

The invention is based on a measuring instrument. DE 29 23 644 C2 has disclosed a sensor for travel measurement which has a cylindrically embodied frame made of a ferromagnetic material. A permanent magnet is moved in a sliding fashion in the frame and its movement is transmitted with the aid of a tappet and is proportional to the movement of a component. Furthermore, a magnetic field sensitive element is disposed in a gap in the frame and is consequently enclosed in the magnetic circuit produced by the magnet and its output signal is proportional to the movement of the magnet. But the sensor is relatively complex and expensive. Furthermore, a high friction losses can be produced with the movement of the magnet, which can distort the output signal.

SUMMARY OF THE INVENTION

The measuring instrument according to the invention, has the advantage over the prior art that for a low assembly cost, a linear output signal can be determined for travel measurements. The distance to be determined is relatively long and can, for example, be 10 mm. In addition, because of its simple construction, the sensor can be incorporated without excessive alteration and assembly costs into systems such as an exhaust gas recirculation valve, valve stroke detection, body spring deflection, or transmission control.

BRIEF DESCRIPTION OF THE DRAWINGS

Exemplary embodiments of the invention are shown in the drawings and will be explained in the description that follows.

FIG. 1 is a longitudinal section through a sensor,

FIG. 1a is a top view,

FIG. 1b is a view of the front end,

FIGS. 2 to 4b respectively show modifications in the same views shown in FIGS. 1 to 1b.

DESCRIPTION OF THE PREFERRED EMBODIMENTS

Figure 2:
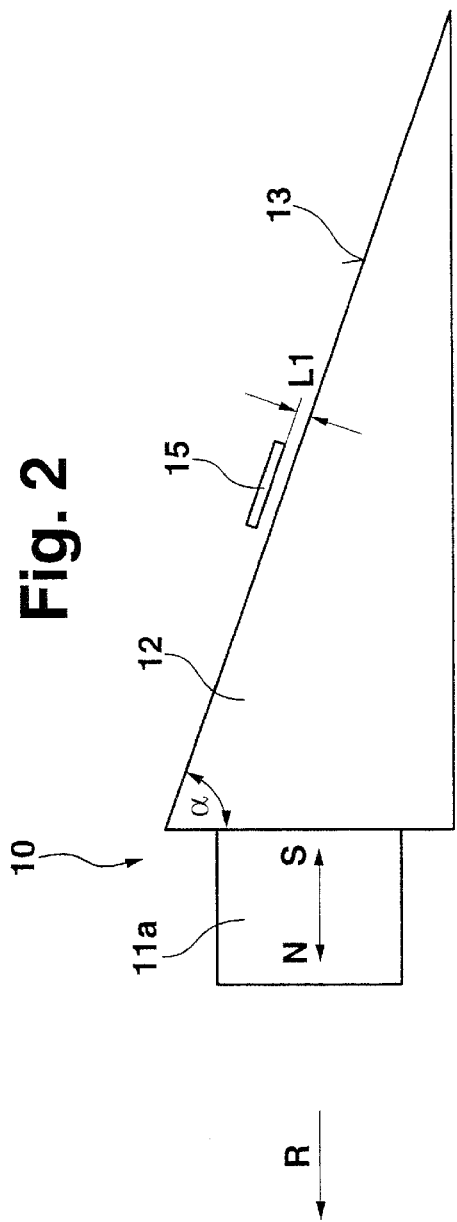
Figure 2A:
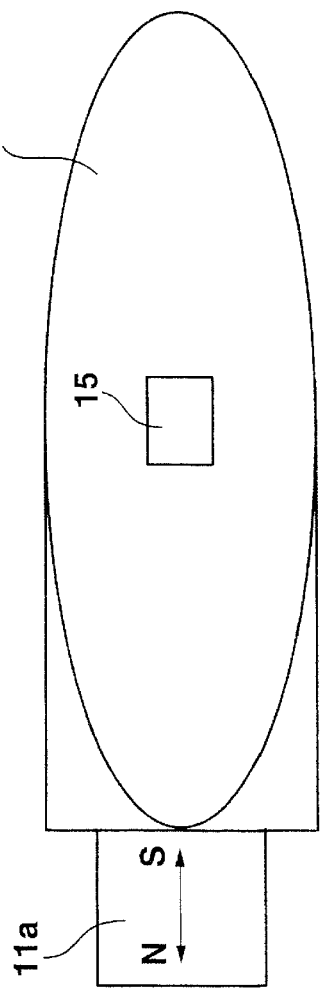
Figure 2B:
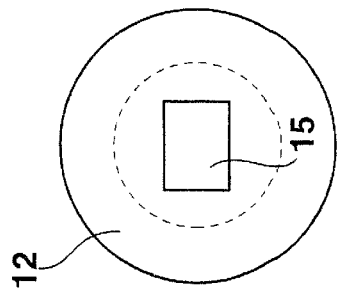

FIG. 1 shows a sensor 10 used to measure the travel of a component that is not shown. The sensor 10 is comprised of a magnet 11, in particular a permanent magnet, which is polarized in the movement direction R, and a flux conducting part 12 made of magnetically conductive material, for example soft iron. The flux conducting part 12 has a surface 13 that is inclined by an angle α in relation to the movement direction R. Furthermore, the flux conducting part 12 is manufactured in the form of a cylinder, i.e. it has a circular cross section at the transition of the magnet 11 to the flux conducting part 12. Because of the virtually cylindrical embodiment of the flux part 12, the surface 13 is embodied as oval, as particularly shown in FIG. 1a. A magnetic field sensitive element 15 is disposed opposite the inclined surface 13 with an air gap L1. For example, magnetic field controlled photoresistance cells, magnet transistors, coils, magnetoresistive elements, or a Hall element can be used as magnetic field sensitive elements 15. It is important in this connection that the magnetic field sensitive element have as linear as possible a dependency of its output signal on the magnetic induction B. As shown in FIG. 1b, the magnet 11 can also be embodied as cylindrical, and can have the same diameter as the flux conducting part 12. Depending on the strength of the magnet and the required magnetic field that is used for the measurement, the magnet 11a can also have a smaller diameter than the flux conducting part 12. As shown in FIG. 3b, it is also not necessary that the magnet 11 be the same shape as the flux conducting part 12. For example, it can also have a quadriform cross section, as shown in FIG. 3b or a rectangular cross section. In the flux conducting part 12, however, it is necessary that the surface 13 have an oval form in order to obtain as linear an output signal as possible.

As shown in FIG. 4, it is not absolutely necessary that the inclined surface 13 begin directly at the transition from the magnet 11 to the flux conducting part 12. As shown in FIG. 4, a collar 20 can also be disposed here before the inclined surface 13 begins. During the movement of the magnet 11 and the flux conducting part 12, which occurs parallel to the component to be measured in the movement direction R, the air gap L1 is enlarged or reduced depending on the movement direction. The magnetic field sensitive element 15 is affixed in a stationary fashion so that the movement of the magnet 11 and the flux conducting part 12 causes the air gap to change due to the inclined surface 13. Because the size of the air gap L1 changes proportionally to the movement direction R, the magnetic field flowing through the magnetic field sensitive element 15 also changes so that the magnetic induction B produced in the element 15 is changed.

Figure 5:
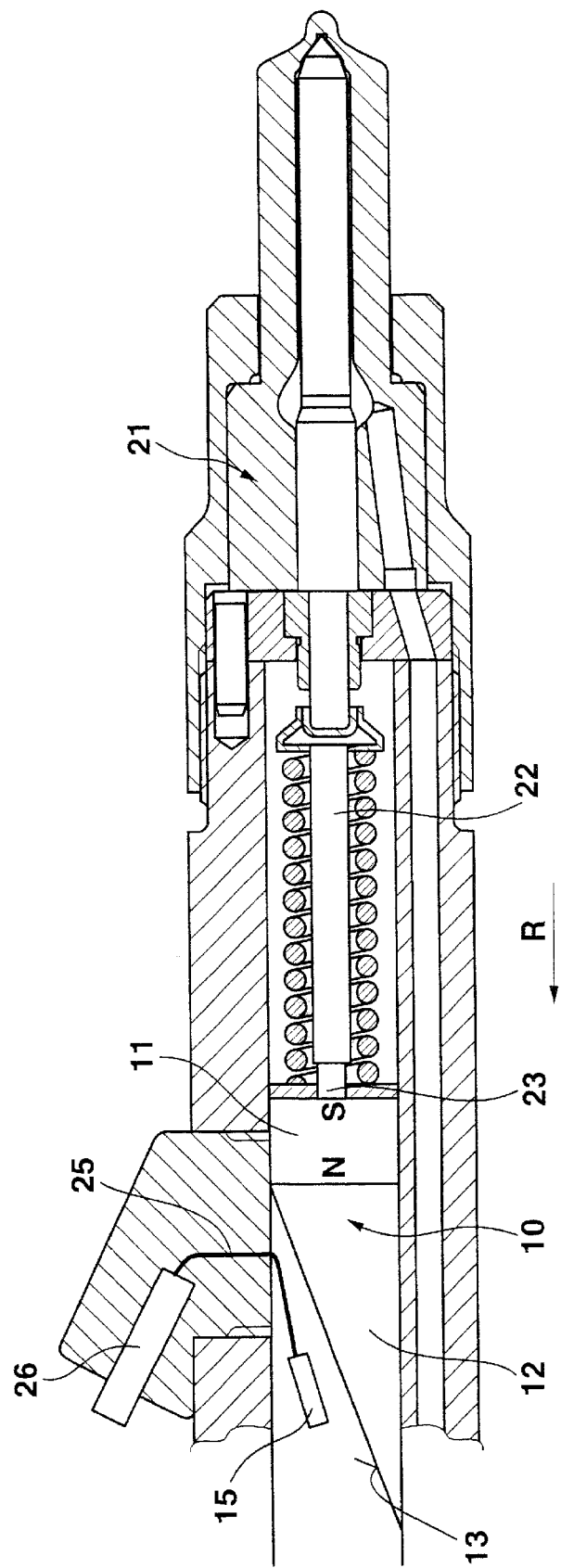
FIG. 5 is a section through an injection nozzle for supplying fuel in a motor vehicle with an internal combustion engine in which the stroke of the nozzle needle is to be detected.

FIG. 5 shows a section through an injection nozzle 21 for the metered supply of fuel to an internal combustion engine, for example a diesel engine. As a mechanical part, a nozzle needle 22, whose function is not explained in detail here, executes partial, relatively short stroke movements in its longitudinal axis in order to open or close a valve seat in the injection nozzle 21. The end 23 of the nozzle needle 22 protrudes through the stop shoulder of the spring of the nozzle needle 22 and is connected to the magnet 11 of the sensor 10 there. The longitudinal axis of the nozzle needle 22 is aligned in the movement direction R. The inclined surface 13 of the flux conducting part 12 is associated with the stationarily disposed magnetic field sensitive element 15. The element 15 is connected with lines 25 to an electric unit 26 which is disposed in the housing of the injection nozzle 21.

What is claimed is:

1. A travel measuring instrument, comprising a flux conducting part composed of magnetically conductive material; a magnet polarized in a movement direction; a magnetic field sensitive element, said flux conducting part having an inclined surface which is operationally connected to said magnetic field sensitive element, said inclined surface of said flux conducting part being substantially oval, and said magnetic field sensitive element and said inclined surface being formed so that a relative motion occurs between said magnetic field element and said inclined surface.

2. A travel measuring instrument as defined in claim 1, wherein said magnetic field sensitive element is located substantially parallel to said inclined surface.

3. A travel measuring instrument as defined in claim 1, wherein said magnetic field sensitive element is a Hall element.

4. A travel measuring instrument as defined in claim 1, wherein said flux conducting part has a round cross-section at least at a transition to said magnet.

5. A travel measuring instrument comprising a flux conducting part composed of magnetically conductive material; a magnet disposed on one end of said flux conducting part; a magnetic field sensitive element, said flux conducting part having a surface which is inclined in relation to a movement direction and is operationally connected to said magnetic field sensitive element, said magnetic field sensitive element and said inclined surface being formed so that a relative motion occurs between said magnet field sensitive element and said inclined surface, said magnetic being polarized in the movement direction and said inclined surface of said flux conducting part being substantially oval.

* * * * *